(12) United States Patent
Bhogal et al.

(10) Patent No.: US 7,530,077 B2
(45) Date of Patent: May 5, 2009

(54) DYNAMIC UPDATE OF CHANGING DATA IN USER APPLICATION VIA MAPPING TO BROKER TOPIC

(75) Inventors: Kulvir Singh Bhogal, Fort Worth, TX (US); Kwang Sik Kang, Astoria, NY (US)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 10/960,583

(22) Filed: Oct. 7, 2004

(65) Prior Publication Data

US 2006/0080596 A1    Apr. 13, 2006

(51) Int. Cl.
G06F 13/00    (2006.01)
(52) U.S. Cl. .................. 719/318; 709/202; 709/242
(58) Field of Classification Search .............. 719/318; 709/202, 242

See application file for complete search history.

(56) References Cited

U.S. PATENT DOCUMENTS

| | | | |
|---|---|---|---|
| 6,438,618 B1 * | 8/2002 | Lortz et al. ............... 719/318 |
| 6,993,771 B1 * | 1/2006 | Hasha et al. ............... 719/318 |
| 7,206,974 B2 * | 4/2007 | Kozlov et al. ............. 714/44 |
| 2003/0046395 A1 * | 3/2003 | Fleming et al. ........... 709/226 |
| 2004/0117802 A1 * | 6/2004 | Green ....................... 719/318 |

* cited by examiner

Primary Examiner—Andy Ho
(74) Attorney, Agent, or Firm—Dillon & Yudell LLP (57) ABSTRACT

A method and service for enabling a smallest unit of variable data within a data space of a user application to be dynamically updated using an external source. The application GUI is enhanced with a dynamic update utility (DUU) that enables the data unit to be selected and linked to the broker topic. A list of available topics is presented for selection by the user, and the data unit automatically linked to the selected broker topic without requiring user knowledge of the specific linking parameters of the external source. A JMS client application is provided containing a message listener and an application writing protocol. A subscriber is defined for the data unit and subscribes to the particular event broker topic hosted at a JMS provider. When the event broker receives a publication from the data publication source, a copy of the published data is forwarded to the message listener associated with the subscriber, and the message listener provides the data to the application writing protocol. The application writing protocol then automatically overwrites the data unit with the published data.

20 Claims, 7 Drawing Sheets

DYNAMIC UPDATE OF CHANGING DATA IN USER APPLICATION VIA MAPPING TO BROKER TOPIC

BACKGROUND OF THE INVENTION

1. Technical Field

The present invention is generally related to computer applications and in particular to spreadsheet applications on a computer system. Still more particularly, the present invention is related to dynamic update of cells within a spreadsheet application via mapping to an external publish/subscribe message source.

2. Description of the Related Art

The use of computer applications and the Internet in every day personal and business applications continues to grow at an astounding pace. One business/technology area in which computer applications are being more and more utilized is that of data compilation and presentation. Software applications, such as spreadsheet applications, for example, have been developed to present a collection of data in an easy to understand format/layout.

Users of spreadsheet applications are provided with individual rows/columns of cells, each of which may be assigned/selected to hold a value of specific data. Once allocated to a cell, the value of the data may be changed within the allocated cell. Additionally, certain cells may be pre-programmed to provide result data that is calculated by an underlying function prescribed by the user. Those skilled in the art are familiar with the data presentation and manipulation features associated with spreadsheet applications.

A spreadsheet application is often used to track data, whose value is frequently changing (i.e., variable data). Financial data, such as stock prices, are an example of data that may be allocated to cells within a spreadsheet, but whose value is variable (i.e., changes over time). It is not uncommon, for example, for a user to use a spreadsheet application on his/her computer to track/view portfolio values (of stocks) in a single interface. Companies may utilize these values within a spreadsheet application to calculate/determine the yields and dividends to pay out to the shareholders of the company, based on some evaluation that requires the current stock price as an input. Individuals and companies alike may utilize this information to determine when to buy and/or sell particular stocks.

These stock values may change on a periodic basis, and the user would prefer to have current values of each stock being tracked within the spreadsheet when the spreadsheet is accessed for stock information. Changing the values within the spreadsheet, however, requires access to the new data value(s) and some method for updating the data within the spreadsheet application. Traditionally, this update would involve the user manually updating each data value as the updated values became available. However, there are spreadsheet-writing protocols to enable programmatic update of the cell values. These spreadsheet-writing protocols are proprietary tools that enable cells within a particular spreadsheet application to be written to. As an example, the HSSF protocol of Apache POI application programming interface (API) enables programmatic writing to cells of a Microsoft Excel spreadsheet.

The updates to the data may be obtained from a variety of different sources, such as the newspaper, television, Internet, or other source. With dynamic changing data such as stock quotes, however, the changing values of the data are oftentimes generated on (or provided by) another computer system, which may broadcast/issue the information for general consumption by interested parties. For example, the stock market computer network of the New York Stock Exchange (NYSE) continuously generates updates to the value of selected ones of the stocks being traded on the US stock market. This information may be provided to the company's or individual's computer system and manually or programmatically updated within the spreadsheet application being used to track the data.

With the traditional and conventional methods, in order to be able to view the current value of the data within his/her spreadsheet application and how that data may affect calculations being performed within the spreadsheet, the user must either (1) manually type in the new value (in place of the older, existing value) in the cell allocated to that data or (2) initiate a programmatic update of the values with the proprietary protocol for updating the cells of the spreadsheet. The timing of this update as well as the "freshness" of the "new" value is dependent on the user. Thus, absent diligent efforts of the user to change the stale values to the new values available, the user's spreadsheet may remain outdated.

When the tracking of data via a spreadsheet application is implemented within a larger business environment, most organizations would prefer their data to be as current as possible. Organizations running time-sensitive business processes, for example, would prefer updates to cell data within their tracking software application to occur on a real time basis. With current spreadsheet applications, even programmatic updates require some levels of manual initiation and manual entering (or loading) of updates to cells. This manual operation requires some level of user-responsiveness to the changing data and may also involve a tedious, labor-intensive process, particularly when entering a large number of variable data. With large organizations that depend on current/up-to-date information, the overall tracking process can become costly in terms of proprietary software required to retrieve the variable data and present it within a specific spreadsheet format. Where some level of manual input is required, some of this cost may be attributed to man-hours spent generating new reports from each update period.

Several messaging protocols exist by which a business/user computer can be sent current updates to particular events in electronic format from a connected network computer generating or reporting the updates. A first such protocol involves a direct point-to-point push of the information from the network computer to the business/user computer. When there are potentially more than one business/user computers to receive information, a recently-developed "subscribe-and-publish" protocol is implemented within a message broker paradigm.

Several conventional message brokers support publish/subscribe messaging paradigm. With the message broker system, a user is able to receive new information or updates to particular information by subscribing to a broker application for receipt of a copy of the updates to the information. Publish/subscribe allows subscribing users to receive the very latest information in an area of interest (for example, stock prices or events such as news flashes or store specials).

A typical publish/subscribe environment has a number of publisher applications sending messages via a broker to a number (potentially a very large number) of subscriber applications located on remote computers across the network. A set of one or more publishers send information to one or more defined message/event brokers, which stores a list of one or more subscribers that have registered their interest in receiving communications of that type. In this case, the subscribers notify the message broker(s) of the message types they wish to receive and this subscription is recorded at the message broker. Publishers send their messages to the message broker, which compares the message type (for example, by checking message header topic fields and/or checking message content) with its stored subscriber information to determine to which subscribers the message should be forwarded. The message broker may perform additional functions, such as filtering, formatting or other processing of received messages before forwarding them to subscribers.

Despite the availability of the publish/subscribe messaging paradigm, there is currently no way for data within a spreadsheet application to be directly updated by incoming data that may be provided as a result of a subscription for updates to that data. While, proprietary software is available to write to a particular spreadsheet application, current implementation does not enable that proprietary software to automatically update a cell within the spreadsheet application with data received from a message broker. The programmatic methods of populating cells within a spreadsheet are thus limited to a particular user-initiation of the update process via a push of the data to the writing protocol.

The present invention recognizes the limitations which exist with updating data values within cells of current spreadsheet applications, and the invention provides a method, system, and program product by which the smallest data unit (cell) of a spreadsheet can be written to with data from an external source. The invention further recognizes the benefits of providing the spreadsheet cell with a scheme for continually enabling dynamic updates to the cell data from an external source following initial set up of that cell for such dynamic updates. The invention further recognizes that it would be desirable to enable a user to select from a provided list of sources/topics to which the cell may be subscribed without the user having to know the exact linking information for the event source. These and other benefits are provided by the invention described herein.

SUMMARY OF THE INVENTION

Disclosed are a method, a service, and a program product for enabling a smallest data unit of variable data within a data space of a user application to be dynamically updated using an external messaging source. The unit of data is linked to the external source using an application graphical user interface (GUI), and the linking process is completed without requiring the user to have knowledge of the specific background linking parameters of the external messaging source. The publish/subscribe protocol is utilized to subscribe the data unit to a specific broker topic for receipt of updates to the topic's data.

An application using JMS (Java Messaging Service) and a spreadsheet application writing API is provided. Using JMS, a subscriber is defined for the data unit to be updated. The subscriber subscribes to a particular event broker topic of a JMS provider. Each subscriber is assigned a Message Listener, which processes messages from the event broker topic it is subscribed to.

A subscriber is given the message when a data provider publishes a message to the event broker topic the subscriber is subscribed to. The subscriber's message listener processes the message by passing it to an application that uses an API to overwrite the data of a data unit with data contained in the message.

In one embodiment, the JMS provider may host multiple topics in a single event broker and/or store multiple events associated per topic. To enable subscribers to receive a specific event of interest from multiple events associated with a particular topic, an SQL (or SQL92) filtering protocol is provided within the JMS client application. Using the specified filtering criterion, the subscription is defined for the specific event of interest within the general topic so that only published updates of that specified event is returned by the subscription to the event broker.

At the user application level, an option to map to a particular topic from among a provided list of event broker topics is provided to the user. The application's GUI is enhanced by a dynamic update utility (DUU) that enables a selected data unit to be linked to the event broker topic (or an event of interest within that topic narrowed by SQL criterion). When the data unit is targeted, and a menu option for automatic update is selected, a list of available subscription topics is presented. The user selects one topic from the list to which to register the data unit for updates. Once the selection of the topic is completed, a background JMS client application receives the selection and assigns a subscriber to the data unit. The subscriber subscribes to the event broker topic hosted on a particular event broker.

In one implementation, a search feature is provided to enable the user to narrow down the list of presented topics from which the user selects to link to the data unit. In another implementation, the user is able to provide the event broker's IP address and port, along with the topic name to which the data unit is to be mapped for updates.

According to the illustrated embodiment, the invention enables users to link spreadsheet cells directly from the spreadsheet application to event broker topics at a networked JMS provider using functions provided within the spreadsheet GUI. The cells in the spreadsheet application are updated using a proprietary API that enables the programmatic manipulation of the spreadsheet. For example, Microsoft Excel cells can be manipulated via the Apache POI API. With the MS Excel spreadsheet application, for example, the subscriber's message listener of JMS API and the Apache POI API are respectively utilized to receive and process data from the topic chosen and write the data to the data unit.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, a service, and a computer program product for enabling dynamic updates to a data unit within a user application executing on a user computer system, where the updates to the data occurs at a remote source to which the computer system is not directly connected.

As utilized within the invention, the term data unit refers to a smallest unit of information within the executing application that can be identified and manipulated. A data unit may be a single character or an entire page of information, so long as the entire data unit can be updated by a single write operation. The data unit may contain variable data, or in some implementations, result data. For purposes of the invention variable data is defined as any user-accessible data that changes over time. Result data is data that is computed using the variable data and thus changes each time the variable data changes. For example, a function such as 20X=Y, contains variable data X and result data Y, which changes whenever X changes. The invention is described from the perspective of user accessible variable data. However, the functionality of the invention may be applied to a display of result data within a function that dynamically receives the variable data updates.

The illustrative embodiment of the invention is described with a spreadsheet application, specifically Microsoft Excel®, which provides individual cells as data units. Within the illustrative embodiment, Apache Poor Obfuscation Implementation (POI) Application Programming Interface (API), specifically the Horrible Spreadsheet Format (HSSF), is utilized to provide programmatic manipulation of cells of a Microsoft Excel spreadsheet. POI and HSSF are defined and explained at http (hypertext transport protocol) site "jakarta.apache.org/poi/". HSSF enables the reading of and writing to Excel files using Java. Those skilled in the art are familiar with POI API and HSSF. The invention may be applied to other spreadsheet applications, although some may require a different proprietary interface to update the cells. With the Excel spreadsheet example, Apache POI API may be provided as a component of the Java library available on the user computer.

Using the ability to write data at the cell level within a spreadsheet application, the invention enables the publish/subscribe paradigm to provide data from remote sources that are then written to the specific data unit (cell) of the local application. Accordingly, with the invention, each data unit (or smallest individually definable unit) may be linked to a particular broker topic. The invention enables users to link spreadsheet cells to broker topics using a graphical user interface (GUI) directly from the spreadsheet application. From the user/application perspective, the user is able to select an event broker topic (or specify an IP address and port, along with a topic name) that the user wishes the cell to be mapped to.

The invention requires a mechanism by which the data unit (or user application) receives updates without requiring a direct link to the data source. The illustrative embodiment of the invention thus makes use of IBM Websphere Business Integration (WBI) Event Broker (EB), developed by International Business Machines (IBM) Corp. IBM WBI provides a family of messaging products that support interoperation between application programs running on different systems in a distributed heterogeneous environment. More specifically, IBM WebSphere Business Integrator represents a portfolio of software products focused on integration under the WebSphere Brand as described on the world-wide web.

A general description of IBM Websphere may be found online at world-wide web (www) site "306.ibm.com/software/info1/websphere/index.jsp?S_TACT=103BGW01&S_CMP=campaign&tab=highlights". Finally, a description of IBM WBI EB may be found online at www site "306.ibm.com/software/integration/wbieventbroker/". IBM WBI EB operates via publish/subscribe messaging domain. In the illustrated embodiment, the functionality of IBM WBI EB is utilized to enable a particular data unit to subscribe to receive updates from an EB topic hosted on the JMS (Java Messaging Service) provider to which the updates are published. IBM and WebSphere (Websphere Business Integration), etc., are trademarks of IBM Corporation.

Notably, while the functional features of invention are described with specific reference to IBM's WBI EB family of products, the invention contemplates a more general application within other proprietary (or non-proprietary) messaging products having similar functionality, and the invention is not limited to the specific embodiments described herein.

Figure 1:
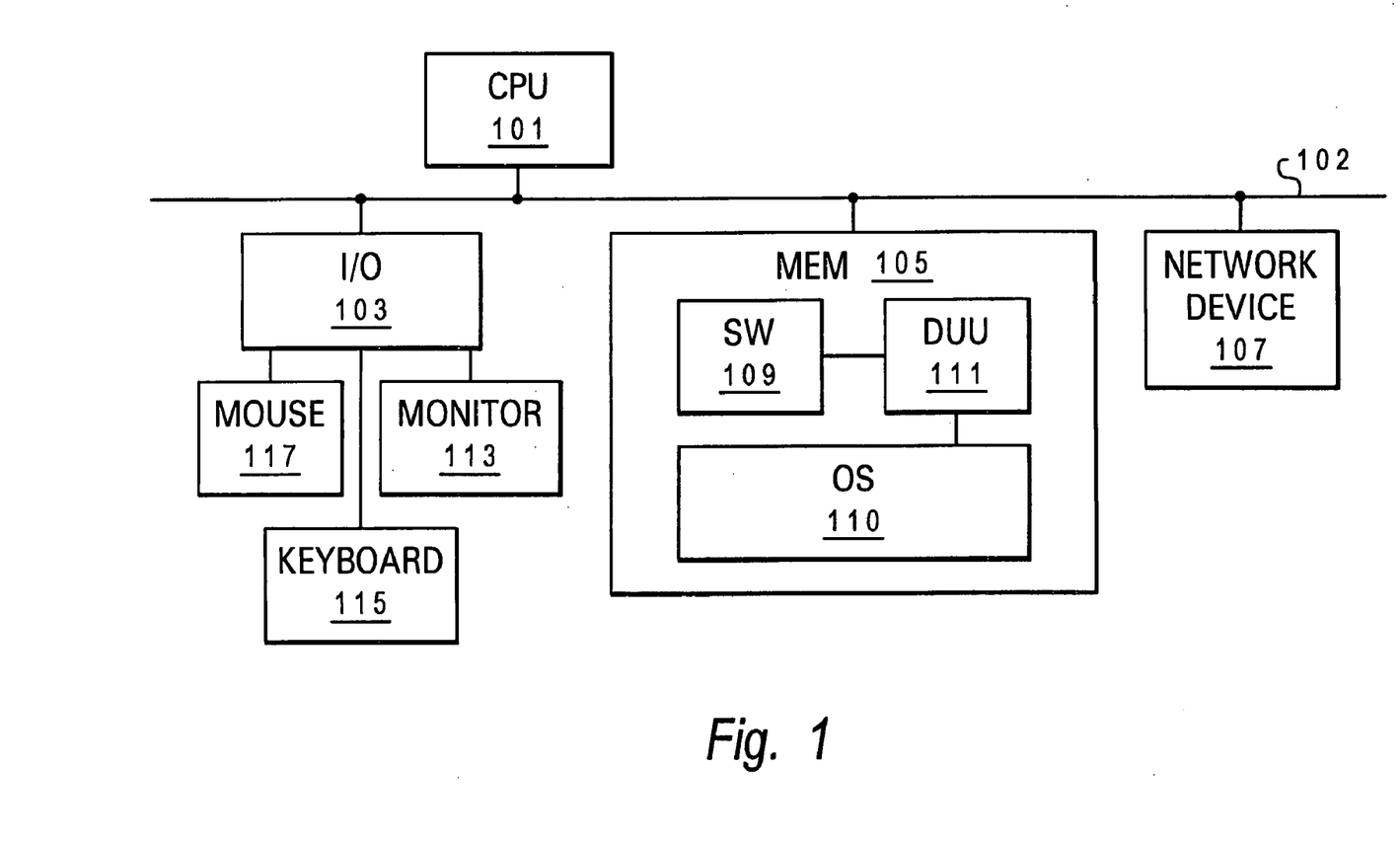
FIG. 1 is a block diagram illustrating hardware and software components of a data processing system within which the features of the invention may advantageously be implemented.
Figure 2:
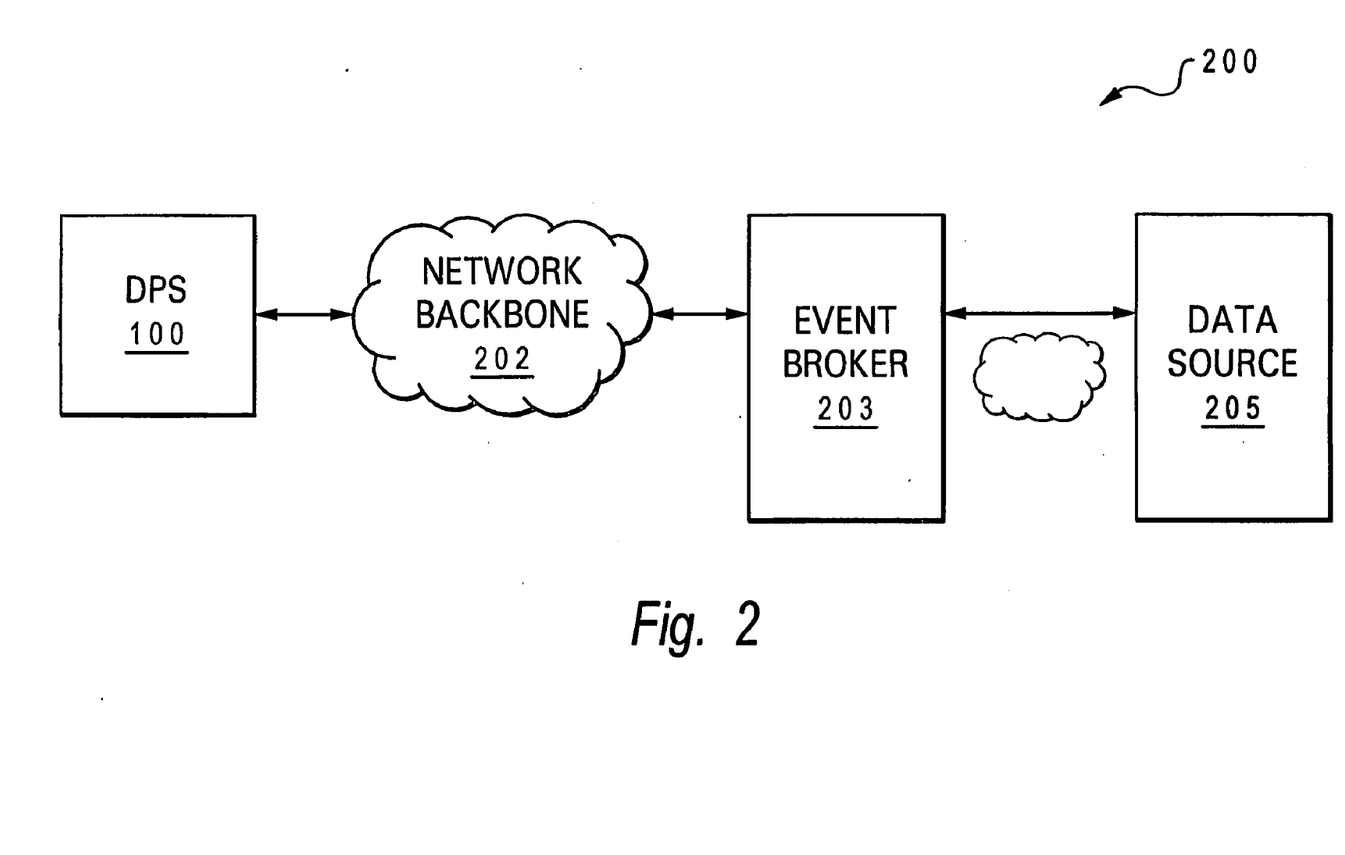
FIG. 2 is a block diagram of a network environment with components that support network communication and data/message transfers required with the implementation of the invention.

Turning now to the figures, and in particular to FIG. 1, there are illustrated specific components of a data processing system within which the various features of the invention may be implemented. Data processing system (DPS) 100 comprises a processor (or central processing unit (CPU)) 101, input/output (I/O) control mechanism 103 and memory 105, all interconnected by a system bus 102. DPS 100 also comprises a network access device 107 by which DPS 100 is able to connect to and communicate with an external network, (e.g., a private LAN or WAN). A network configuration is illustrated in FIG. 2, which is described below. Connected to I/O control mechanism 103 are output devices, such as monitor 113, and input devices, including keyboard 115 and mouse 117. During implementation of the user-interface portion of the invention, the user inputs requests, or configuration (set-up) information via one or more of the input devices and views the spreadsheet of variable and/or result data via the output device.

Figure 3:
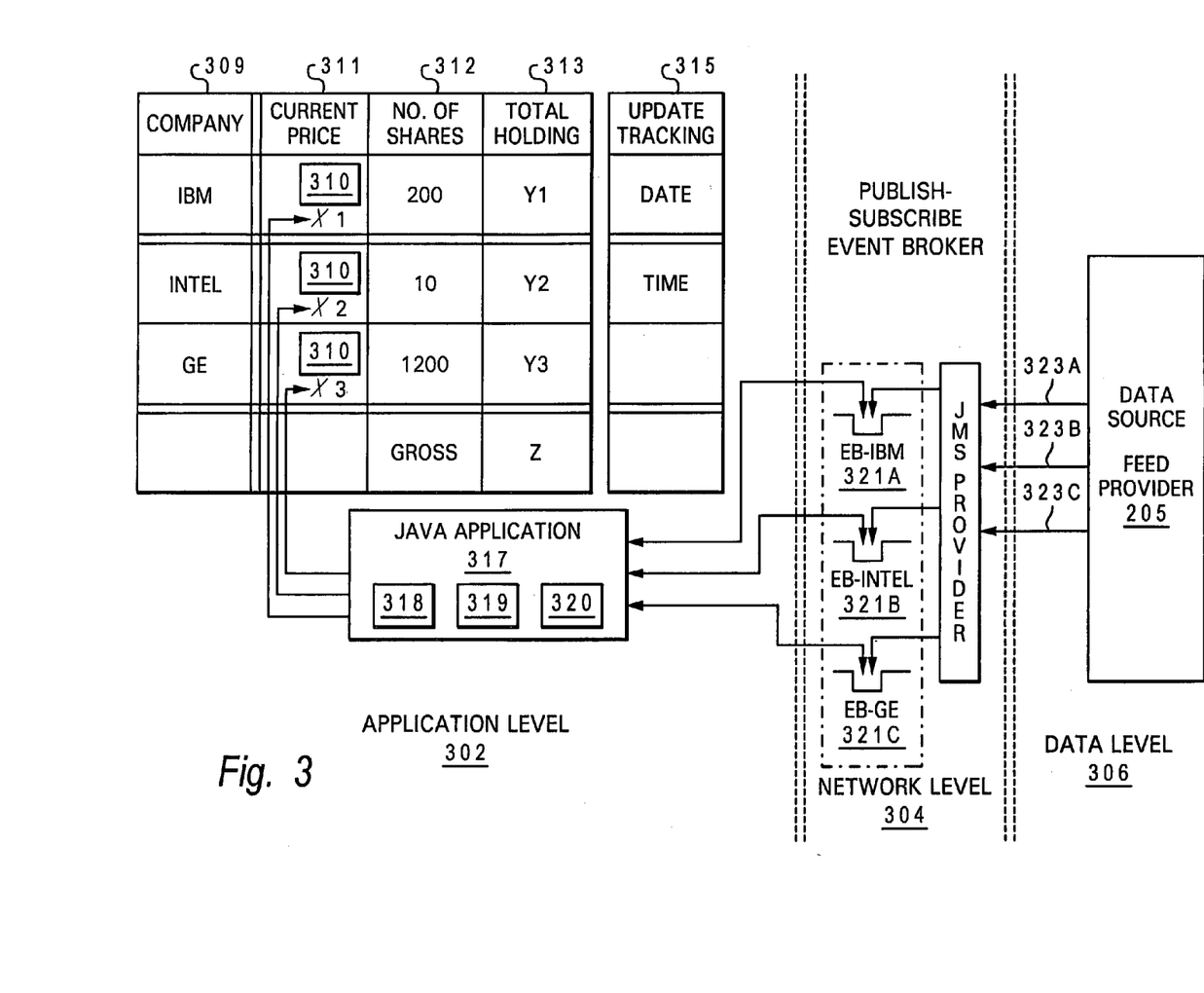
FIG. 3 illustrates a distributed system environment with three levels of message and/or data exchange/transfer within the network of FIG. 2 that enables direct updates to variable data within a user application via a publish/subscribe messaging paradigm, according to one embodiment of the invention.

Memory 105 holds several software components that provide software code executed by CPU 101 in order for DPS 100 to operate/function. Among these software components are operating system (OS) 110, and software (SW) application 109 as well as dynamic update utility (DUU) 111. In addition to the SW application 109 and DUU 111, DPS 100 comprises JMS client application 121, which provides a Java library including an Application Programming Interface (API). Additional features of JMS client application 121 are illustrated in FIG. 3 and described below.

SW application 109 provides a graphical user interface (GUI) that displays variable data, which requires updates from an external source, via a user input or some other input, as provided by the invention. Specifically, for illustrative purposes, SW application 109 will be described as a spreadsheet application, and more specifically a Microsoft Excel Spreadsheet application (Excel is a trademark of Microsoft Corporation).

In a first implementation, DUU 111 is a separate SW component from SW application 109 and may be installed after the installation of the SW application 109 on DPS 100. With this implementation, DUU 111 is provided as a plug-in or add-on to the SW application 109, and may be purchased off-the-shelf or downloaded from an online source, such as a service provider (described below).

In another implementation, however, the DUU program code is provided as part of SW application 109 so that the DUU functionality and other features of the invention are intrinsic to the SW application 109 and available when the SW application 109 is first installed. Finally, DUU 111 may actually be provided as a utility within JMS client application 121.

Notably, a user may be given the opportunity to dynamically configure DUU 111 during initial setup of the functionality. The level of user-input in setting up DUU 111 is determinable and is further described below. DUU 111 may operate as a background service that pops up on screen whenever the application is opened on the user's DPS or responsive to the user initiating a manual update of a value within the SW application. DUU functionality may also be provided as a special selectable icon or bar within the SW application GUI.

With reference now to FIG. 2, there is illustrated a network configuration according to one implementation of the invention. Network 200 may be a private local area network (LAN) or wide area network (WAN). Network 200 comprises a network backbone 202 to which is connected a user computer system, e.g., DPS 100, and an Event Broker server (JMS Provider) 203. Network backbone includes a JMS transport layer for messaging via publish/subscribe messaging paradigm, which is supported by JMS client application's API and JMS provider 203. Connected to JMS provider 203 is a data source 205 at which data updates are generated. EB topics on JMS provider 203 serve as subscription points for the published data that is generated at data source 205 and is requested (via subscription) by subscribers defined by JMS client application 121. Any type of connection medium between DPS 100 and network backbone 202, network backbone 202 and JMS provider 203, and JMS provider 203 and data source 205 may be utilized, including wired or wireless medium, and direct or indirect connection (i.e., via a proxy). JMS may be provided via one of several available transport protocols including Multicast, HTTP, direct TCP/IP or MQ Bindings.

Referring now to FIG. 3, there is illustrated a block diagram representation of the stages of messaging between the user application, JMS provider, and data source that enables the features of the invention. The interactions/exchanges of information/data/messages are completed via the JMS transport mechanism at the network layer. Three functional stages are provided, the user application stage 302, the network stage 304, and the data publication stage 306.

The user application stage 302 includes a spreadsheet 300, which is visually represented by a graphical user interface (GUI) of a SW application executing on the DPS. Spreadsheet 300 includes several active rows of information, each representing a company 309 whose stocks are being monitored/tracked. As provided, the companies of interested in the present example are IBM, INTEL and GE (each being the trademark/service mark of the respective company). In addition to the company name 309, each row of spreadsheet 300 includes three columns (adjacent cells) of information, including current stock price 311, number of shares 312, and total holding 313.

In one implementation, a selection mechanism 310 is provided within each entry of current stock price 311 to enable the user to subscribe the data unit for receipt of updates to the value within current price 311, as described in greater detail below. Each entry of current stock price 311 has variable data ($X_n$), while the entry of total holding 313 holds result data ($Y_n$), determined by multiplying the current value within current stock price 311 of a particular row by the number of shares 312 provided within that row.

Spreadsheet 300 also includes a gross entry (Z) 314, which is a secondary result data calculated by summing each of the values of $Y_n$. The multiplication, summation and other (more or less complex) functions within spreadsheet 300 are known to those skilled in the art and are not a primary focus of the invention. What the invention focuses on, is the ability to dynamically update the variable data ($X_n$) within current price 311 via use of a publish/subscribe messaging network and a spreadsheet cell writing utility/application that enables programmatic updates to specific spreadsheet cells.

In one implementation, described in detail below, an option to map to a particular topic from among a provided list of possible event broker topics is made available. The application GUI is enhanced with the dynamic update utility (DUU) that enables the data unit to be selected and linked to the broker topic. When the data unit is highlighted and the menu option for providing automatic updates is selected, a list of available subscription topics is presented. The user selects one topic (from the list) to which to link the data unit to receive updates. Once the selection of the topic is completed, a JMS client application receives the selection and subscribes, via subscription functionality, to the message broker hosting the selected topic. In one implementation, a search feature is provided to enable the user to narrow down the list of presented topics from which the user links the data unit. In another implementation, the user may provide the event broker IP address, port, and topic name to which the data unit is to be mapped.

To enable the dynamic update of the data units, the user application stage also maintains a communication interface, provided by JMS client application 121. JMS client application 121 comprises several of the conventional components utilized to enable message subscriptions within publish/subscribe messaging environment. JMS client application 121 maintains subscriptions (i.e., subscribers with associated message listeners) to designated EB topics.

Thus, included within JMS client application 121 is one or more message listener(s) 318. 318 is an implementation of the message listener interface that is associated to one or more subscribers. Message listener 318 is used to receive and process asynchronously delivered messages from the EB server. Message listener 318 provides a bridge that listens to published data on the network and initiates a writing of relevant data to data units. When new data is published, the subscriber is notified and the message listener's "onMessage" method is triggered. Background information regarding the JMS API may be found at the java web site published by Sun Microsystems.

JMS client application 121 also uses application writing API 319 (e.g., Apache POI API), which includes the writing API (e.g., HSSF) to write to the data unit (cell) within the application (spreadsheet). The application writing API/protocol 319 may be non-proprietary or proprietary, depending on the particular user application. When the event broker receives a publication from the event source, a copy of the published data is retrieved by the subscriber, whose associated message listener implementation uses the application writing API to update the value of a specified data unit with data contained in the message payload.

With the specific illustrative embodiment, when the message listener processes the data received from the EB topic, the message listener uses the HSSF API to write data to a specific cell within the Excel spreadsheet. Other proprietary applications may be required to write to specific user applications that do not support the POI HSSF write functionality. Thus, while described with specific APIs and associated features (e.g., HSSF), this description is not meant to be limiting on the invention. The invention may be completed with other types of APIs (some proprietary to the user application receiving the updates) to enable these dynamic updates to data units within the application.

In one implementation, the combination of (1) one or more of the added GUI options/features for selecting a dynamic update of the data unit, (2) extended features of the message listener functionality, and (3) the application writing protocol, etc. may be packaged as the DUU. This enables the full functionality required to perform the dynamic updates to be provided as a single software program (service package) installed on the user's computer.

In FIG. 3, the network level 304 comprises a publish/subscribe event broker server, such as IBM WBI EB, described above. In the illustrative embodiment, a dedicated event broker topic (EB) is provided for each data type being listened for (e.g., a current stock price). According to FIG. 3, an event broker topic has been established for the specific data type for each of the companies to which the user application's cell may be associated. JMS Provider is an application running on a network server, which is accessible via a private LAN or WAN (or Internet). JMS Provider 322 receives information on dedicated topics from a data source 205. Thus, IBM-EB topic 321A, INTEL-EB topic 321B, and GE-EB topic 321C are each illustrated representing the EB topic on the JMS Provider that receives published updates of data related to each respective company. Any message received at an EB topic is then sent directly to the subscribers subscribed to the specific EB topic.

In the example message/event broker network, feed providers publish messages that are sent to one or more event brokers of the JMS provider. Publishers typically specify topic names for the messages they are publishing, and subscribers specify topic names for the messages they are interested in receiving. The event broker includes a matching engine, which compares an incoming message with the subscription profiles of the various subscribers to identify matches, and passes matching messages to an output component for forwarding the message to the relevant subscribers. For example, the IBM cell within the spreadsheet application may be registered to receive all updates related to the IBM stock price, and the mapping of the data unit to the specific IBM topic is completed by sending a subscription request with topic defined as "Stock/IBM" to the event broker. The event broker stores this subscription information. Then, when a message arrives at the event broker from a source provider (publisher) with the topic "Stock/IBM" included in the message header, the IBM event broker retrieves its subscription list, identifies that the message matches the subscription profile for the subscription, and notifies the subscriber that the message can be retrieved.

A single event broker may host a plurality of different topics of interest (i.e., events) to the customer/subscribers. Thus, for example, a single "stock price" event broker, accessible by a single port and address parameters, may host the stock prices for IBM, Microsoft, and GM, etc. A data unit's subscriber may need to subscribe to receive only a specific stock price (e.g., IBM sock price) and does so by subscribing to a particular topic on the broker. Alternatively, a single IBM event broker topic may receive published information for a number of different events associated with IBM. The subscriber may be only interested in a particular event related to IBM, e.g., IBM stock price (not IBM ratings or IBM announcements).

SQL Filtering

In order to accommodate EB with multiple topics or with multiple events within a single topic, the invention provides a filtering mechanism for use within the subscription. SQL (or SQL92) protocol is utilized to define specific messages within the topic and establishes certain criteria that have to be met before a published message is sent to the subscriber. The SQL in essence filters the EB topic to listen for only specific data of interest. At the user application stage, the data unit is being mapped directly to the specific event within the EB topic (rather than the general EB topic), although the functionality which makes this possible is handled by the filtering criterion.

The subscriber is thus able to further specify which topic/event hosted on the EB is of interest to the subscriber from among multiple topics/events within a single EB. For example, an IBM-EB topic may contain multiple types of events/information associated with IBM, such as, IBM's last trade stock price, trading volume, and the moving average for a 5 Year Treasury note. The subscriber is however only interested in receiving the IBM stock price and specifies this as a filtering criterion within the subscription. From a user application perspective, the user is provided with the sub-categories/events within the EB topic as a part of the list of available topics (as illustrated within FIGS. 4A and 4B). The subscriber specifies which filter to include within the subscription. The subscriber subscribes to the IBM-EB but the filter monitors the published data so that only a publication of the IBM stock price is returned to the subscriber. The message listener is thus provided with only a subset of the messages within the topic to listen to and process. To enable multiple data units (cells) of the same application to concurrently subscribe for dynamic updates from a single EB topic, an SQL (or SQL92) filtering protocol 320 is provided within the JMS client application 121.

Data Publication Level

The data publication level 306 is represented by a dynamic data generation facility, such as stock price index, that generates new values of data associated with particular events that dynamically change. The data source 205 includes a feed provider that publishes data that is sent to JMS provider 322, which forwards the data to event broker topics that are registered with the feed provider to receive published data. The feed provider transmits the published messages/data via some transport mechanism such as multicast or direct TCP.

According to the invention, stock price data associated with each of the respective companies' stock prices are published to the event broker hosting the topic related to that company. Thus, for the illustrative embodiment, three publishing/message paths are illustrated, IBM-topic message 323A updating IBM-topic 321A, INTEL-topic message 323B updating INTEL-topic 321B, and GE-topic message 323C updating GE-topic 321C.

Service Provider

In one embodiment, a service provider may maintain the JMS Provider with event brokers to which the applications are subscribed. The invention then enables the service provider to provide the network level functions as well as provide the DUU to the customer as a service software package that enables the customer to receive dynamic updates within specific SW applications running on the customer's computer. The DUU program functionality may be provided as an executable utility that is downloaded from the service provider's server. Alternatively, the DUU may be packaged as a software program and shipped (or distributed) to customers or potential customers. The service provider maintains the JMS provider with event brokers hosting updated topics of interest. The service provider may charge a fee for each subscription for updates or for each update, etc.

Old and New Methods for Updating Spreadsheet Cells

Communication between the user application stage 302 and the network stage 304 involves the publish/subscribe messaging paradigm. FIG. 5B illustrates the method by which the communication is established and FIG. 5C illustrates how the actual updates are completed following an update within the EB topic of a particular company. Notably, the methods differ from that of the prior art, which is depicted in the flow chart of FIG. 5A.

Figure 5A:
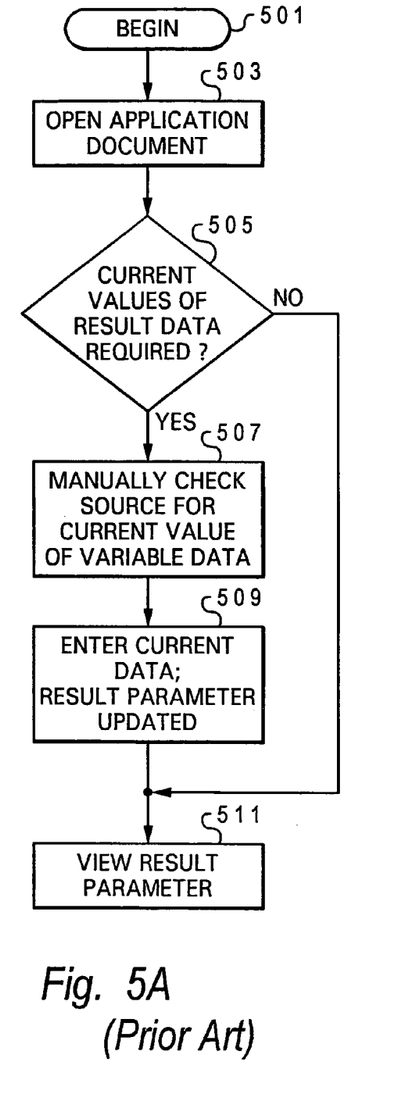
FIG. 5A is a flow chart of the prior art method of manually updating changing data within an application.
Figure 5B:
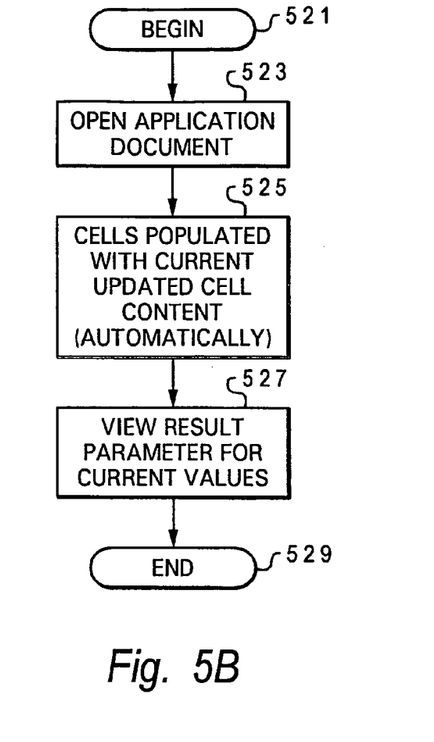
FIG. 5B is a flow chart of the process of interfacing with an application, whose data units are linked for dynamic updates from an external messaging source according to one implementation of the present invention.
Figure 5C:
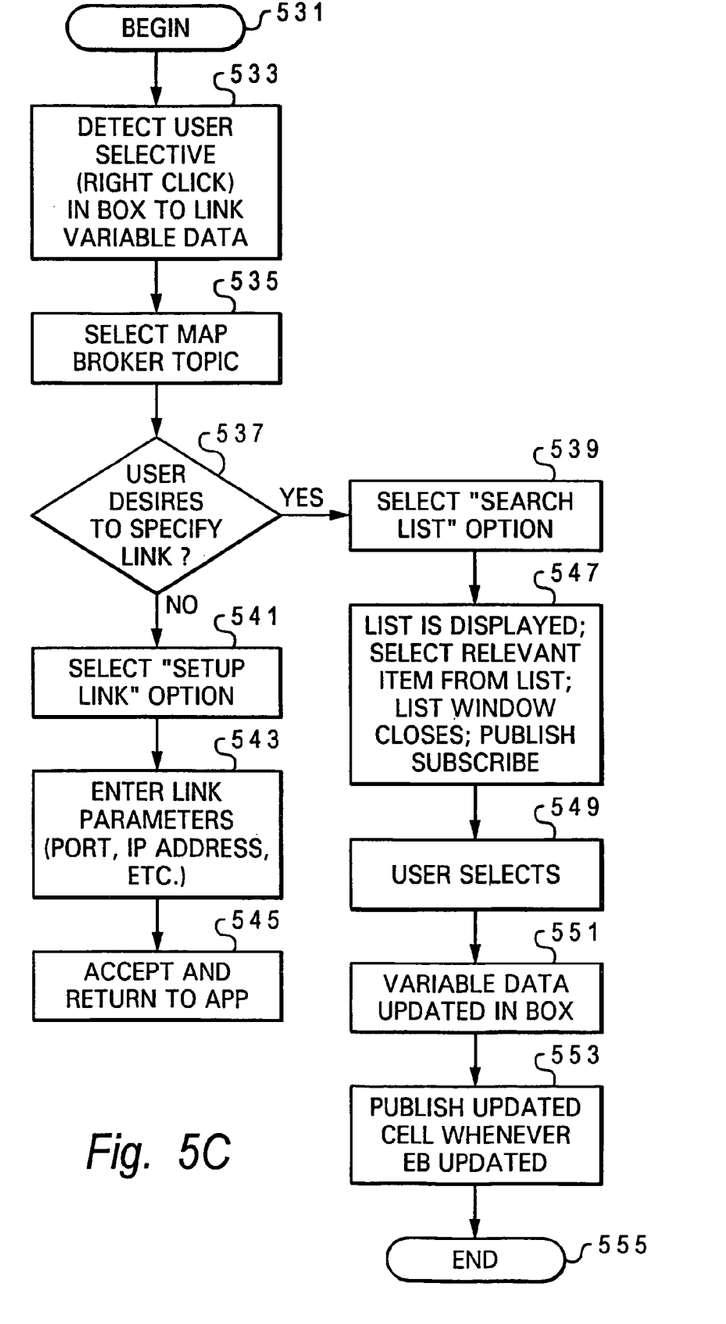
FIG. 5C is a flow chart of the process of configuring a data unit for dynamic updates from an external messaging source according to the one embodiment of the present invention.

FIG. 5A illustrates the manual, user-completed process by which a spreadsheet being utilized to track variable information (that is being updated at a different computing facility/system) is updated. The process begins at block 501, and proceeds to block 503 at which the user opens the spreadsheet application GUI (or document). The application GUI displays the cells with the information with which the application was last saved and the last user-entered update of the variable component and result data. A determination is made by the user at block 505 whether the user wishes to obtain a current value of a variable data. If the user wishes to view or compute current variable data, the user manually locates a source of the current values of the variable data (by going to the internet, publication, television, or other source) as shown at block 507.

The user then enters the data into the respective cell at block 509. Entry of current variable data then yields current result data, which the user is able to view within the spreadsheet application, as indicated at block 511. The process is then repeated for each variable data to which the user desires to view the current variable data and resulting data (if any). This process notably involves large amounts of user-activity beyond opening the spreadsheet to enable user access to a source of current data that is updated/generated at some source separate from the application is which the user actually tracks the data.

FIG. 5B illustrates the dynamic (non-user-intensive) method for receiving current updates to the cell's variable data (and corresponding updates to result data) without extensive user actions. According to the process, the user initially sets up the cell to receive current updates from an EB topic to which that cell is linked via a background messaging protocol. Thus the process begins at block 521 and proceeds to block 523 at which the user opens the application document. The current variable data and result data are populated within their respective cells at block 525, and periodically updated via a background process within the spreadsheet GUI. The user views the current value of the variable data immediately, with very little effort, as shown at block 527. The process of automatically populating the cells with current data continues via the background messaging protocol so long as the computer is communicatively coupled to the network from which the updated data is received. The user is, therefore, always provided current data within the application GUI without much additional user effort In one embodiment, each cell that is configured for dynamic updates is tracked in a separate column within the spreadsheet or in a background monitoring application/utility used to monitor changes within the main spreadsheet. As illustrated by FIG. 3, the tracking column 315 mirrors the cells that are updated (with respect to row location) within the column. This enables a quick reference to tracking column 315 via a spatial (horizontal) check and without having to know the topic being tracked. In one implementation, the tracking column maintains at least one or more of: (1) a time stamp indicating the time of the last update; (2) a date stamp indicating the date of the last update (for updates that occur on longer intervals of days or weeks); and (3) source of input data. Whenever a data unit is updated, a java time stamp is obtained and stored as a persistent value within the tracking column. In one embodiment, this feature may be turned on/off. Alternatively, the tracking may always be on, but the user is provided a selectable option to display the tracking data when configuring the data unit for dynamic updates.

In one implementation, the right click of the cell provides a "properties" option that, when selected, provides the time and date (and/or source) of the last update to that cell. In another embodiment, placing the pointer over the cell also provides information about the contents of the cell, including time and date of last update and source of data. In another embodiment, historical values of the variable data are stored and accessible via a different option. This enables the user to check his data from a historical perspective. One extension of this implementation involves indicating actual time stamps along with the degrees of how old the data is.

Figure 4A:
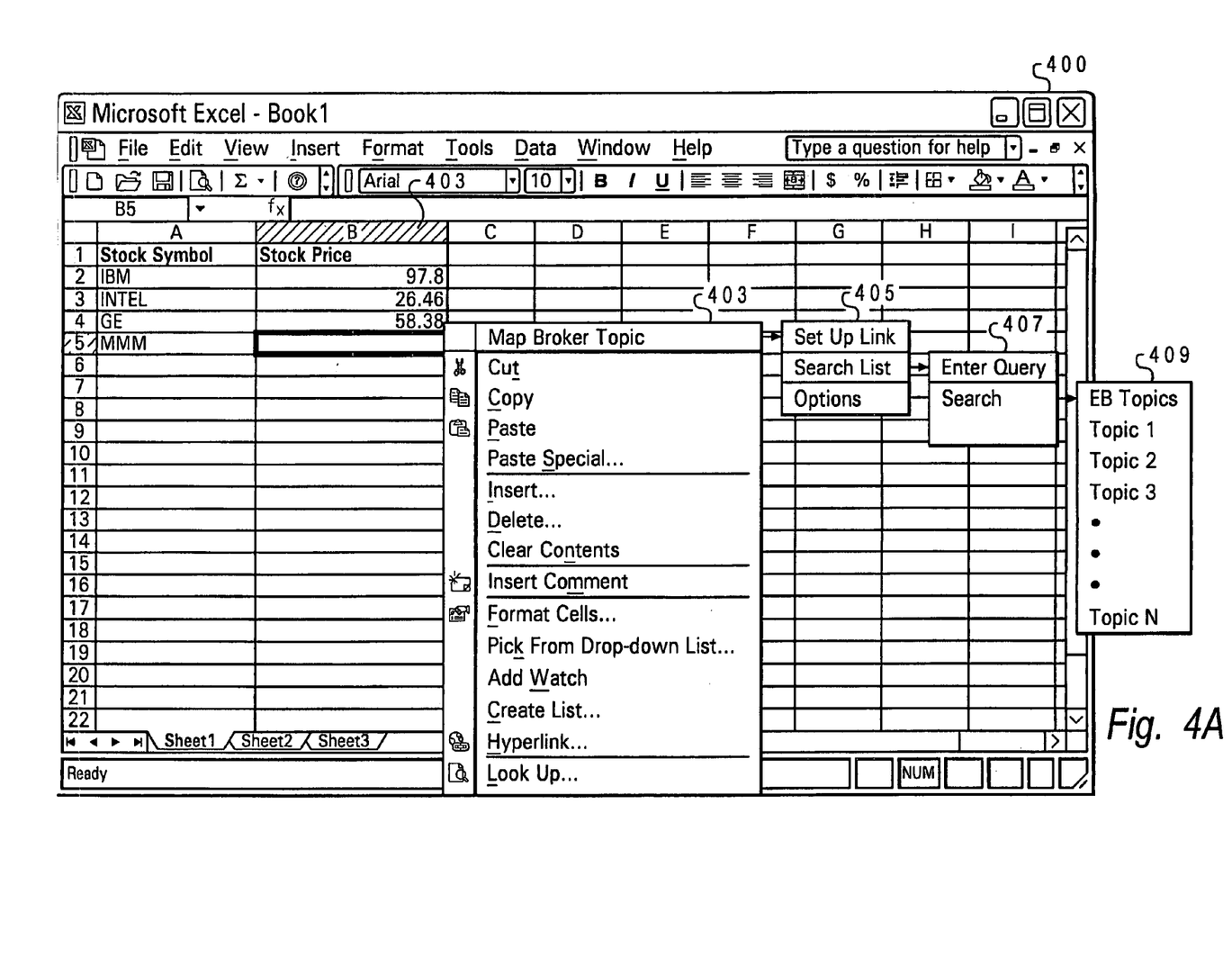
FIGS. 4A and 4B are graphical user interfaces (GUIs) displaying a spreadsheet application with child/menu windows providing a user with options for configuring a cell to receive dynamic updates to data from a sample list of selectable topics to which the user may map/link the cell in accordance with two implementations of the invention.
Figure 4B:
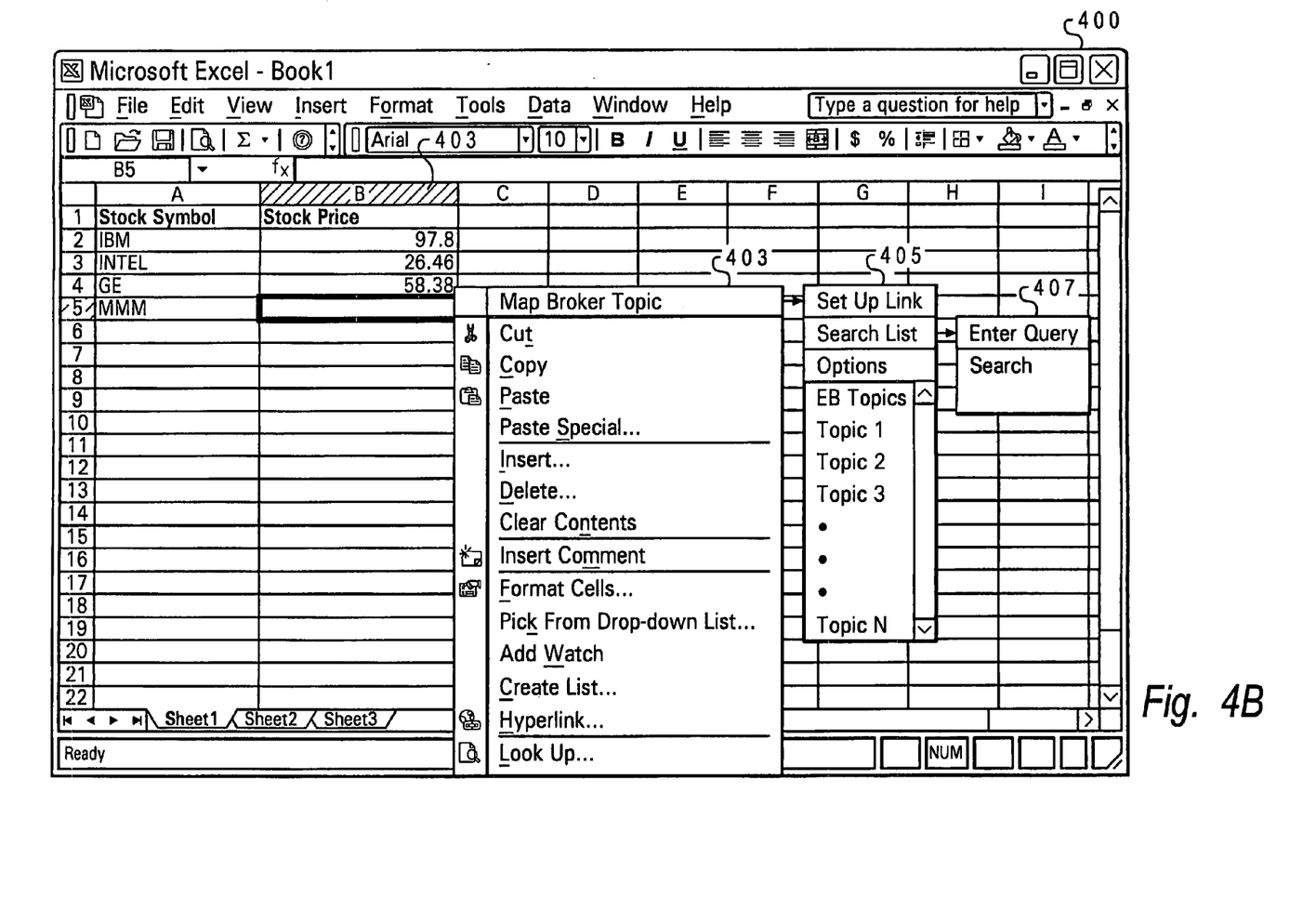

Looking specifically at FIGS. 4A and 4B, there are illustrated two GUI displays of the functional aspects of setting up the cell of the application on a user's computer. In the first illustration, cell B5 is selected for set up to link/subscribe to an event broker server topic. Selection of that cell opens menu 403 in which "Map Broker Topic" is displayed. Further selection of "Map Broker Topic" results in opening of first window 405, having two main selections (1) "set up link" and "search list." FIG. 4A illustrates the next stage of selecting the "search list" option from first window 405. As shown, a second window 407 is provided with an entry for entering specific search/query terms for narrowing down the search of available event broker topics. Once the user has completed interacting with the window either by entering a specific search term or ignoring this field and selecting the search option, a topics window 409 is opened and populated with a list of available EB topics.

FIG. 4B illustrates an alternate embodiment in which the list of EB topics is automatically displayed within first window 405 when the map broker topic option is selected from menu 403. First window 405 includes a scroll function for scrolling through the list of available topics. As with FIG. 4A, the search options may still be made accessible via a menu item on the first window 405. With either embodiment, return of the list may initially require the list be downloaded from the service provider (unless provided as a database affiliated with DUU, which is periodically updated via the background network after initial installation of DUU). However, once the list is downloaded, the list maybe stored in the local memory allocated to the JMS client application for quick access and display when a new data unit is being linked for dynamic updates. Updates to this list are provided by the service provider via some "push" protocol, whereby the updates are directly broadcasted to the IP addresses associated with subscribed user systems.

Another embodiment stores the list at the list server of the service provider, and the list is (virtually displayed) at the user computer when required. This embodiment assumes the user computer maintains continuous access to the network on which the server of the service provider exists. Alternatively, a mechanism may be provided to allow a quick access to the network to download the list from the server when required and keep the list available for additional links while the application remains opened on the user's computer system.

FIG. 5C is a flow chart illustrating the process of actually setting up the particular cell of the application worksheet as a variable entry cell that receives periodic updates from an external source. Several alternate methods are available for completing the process of setting up the cell, and each method may be implemented within the same application, based on the user selections during installation and configuration (or set-up) of the DUU and/or the DUU functionality of the SW application.

The process begins at block 531 and proceeds to block 533 at which the application is opened and a user selection (via right click of the mouse or otherwise) is received within a particular cell that the user wishes to set up for receipt of variable data from an external event broker function. When the user selection is received, a menu of selectable options is provided to the user, including some standard options and a "Map Broker Topic" option. The user selects the "map broker topic" option and a next selection window is provided to determine whether the user wishes to specify the link (IP address, etc.) of the event broker application to which the cell should be linked. If the user wishes to enter a specific link, the user selects the "setup link" option at block 541. A field is provided for the user to enter the IP address and other required parameters for subscribing to the particular EB topic at block 543. Once the information is entered, the user selects "enter" at block 545, and the DUU registers the cell (or subscribes) with the specified event broker for automatic updates of variable data within the cell.

Returning to decision block 537, if the user does not wish to personally enter the parameters for accessing the event broker, the user selects the "search list" option at block 539. Once this option is selected, the JMS client is activated and assigns subscriber functionality to the data unit. Concurrently, the user is provided with a list of all available event broker topics to which the user may subscribe at block 547. The user is then able to select one of the event broker topics from the list at block 549 to link to the cell. Whenever the data within the event broker is updated, the update is forwarded to the user application (also via JMS) to be written to the specific cell, as shown at block 553. The process of writing the update to the cell is described above.

Color-Coding Updates

Selection of a particular event from the list results in the DUU retrieving the "link" information (port name, IP address, topic, etc.) of the EB server associated with the event broker topic. The DUU prepares a subscription message and includes in the subscription the link information, including the topic name. Concurrently, the DUU updates its subscription table with a new entry specifying the location of the data unit (e.g., the cell address), the topic name, and any other filtering information relevant to the subscription (e.g., whether to maintain a tracking column with time stamps, etc.) This information is utilized when a message is returned from an EB that hosts multiple topics.

In one implementation, an update indicator is provided within the cell to indicate when the values are current values. This determination may entail a check of (1) whether the cell value has been updated within a last predetermined time frame (e.g., 10 seconds) since the previous update, (2) whether the user's computer system is connected to the network that enables it to access and/or communicate with the EB, or (3) whether the user has turned the dynamic update function on (or off), etc. The update column (or the entire cell) may be color-coded to indicate when the value is current. For example, a green color may indicate current value, while a red color may indicate stale value. Alternatively, the entire cell may be grayed out to indicate when the degrees of how old the data is. Color coding of the cells are completed via HSSF.

In another implementation, the user is able to activate an Internet sign-on process via modem or other network access component to connect to the internet or network server in order to access the server on which the EB topic is being hosted.

Although described as an option to be selected by the user, the search list may be provided by DUU as a default option, such that the user is automatically provided with the list of available event broker topics to which the cell may be linked for data. The list is automatically populated in response to the user selecting the "map broker topic" option from the menu. The user may then scroll through the list, and if the list does not include the event broker desired by the user, the user may then select an option to enter specific search parameters for another event broker.

Automatic List of Topics

In another implementation, the user is actually provided a search window in which the search terms associated with the event being monitored may be entered to narrow the search, and only the corresponding/relevant list is returned for the user to scroll through. For example, the user may enter "IBM stocks" as a search term, and the search engine would then search for and return only a list of event broker topics having some association with IBM stocks. This implementation removes the time/effort of finding relevant event brokers from the global list of all event brokers and broker topics and makes it a function of the search utility. Also, this implementation enables the dynamic generation of a link to an event broker topic without actual user input of specific link information. In one implementation, SQL92 tooling filters any information that is received at a particular topic based on query strings provided. The SQL filtering criteria is provided along with the topic.

The present invention recognizes that many organizations would like to have cell data of their spreadsheets updated on a real time basis. With the illustrative embodiment of the invention, each cell of variable data is linked to a WBI EB topic to obtain data from via publish/subscribe messaging domain. Users are thus able to link their spread sheet cells to broker topics via the processes of the invention. The invention requires the user to set up links within cells of the spreadsheet that are allocated to data, which are being dynamically updated at another source accessible via a network.

The invention finds applicability to large scale operations of businesses that track time-sensitive variable data to the simple individual consumer who wishes to track some event within an application running on his local computer when the event is constantly changing at an external (network accessible) source. Although described within the context of spreadsheet applications, the invention may also be applicable to other areas besides spreadsheet applications. For example, the features of the invention may be applied to quality control feeds, fantasy football, etc. Additionally, the invention may also be applied to data units within other types of SW applications (e.g., MS Word documents) that can be confined to a definable/addressable location within the user interface portion of the application.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In a data processing system having an application program with a data unit having data, a method for enabling dynamic, real-time updates to data of the data unit, said method comprising:
    associating the data unit to a topic on an event broker on a network, wherein said event broker topic receives updates to said data by an external data source;
    receiving said updates from said event broker via a message transfer service of the network; and
    automatically updating data in the data unit in response to receiving said updates, wherein said updating occurs independent of other data units within the application program and said updating replaces one of a null version and an older version of the data within the data unit with a newer version of the data and provides the older version of the data when no update of the data is received.

2. The method of claim 1, wherein said associating step uses a publish/subscribe messaging paradigm and includes creating a subscription of said data unit to said event broker topic, said subscription having a corresponding message listener for receiving updates from said event broker, and wherein the associating step is performed using a graphical user interface (GUI), which is a visual component of said application program that displays the data to a user, and wherein said associating step includes:
    selecting the data unit within the application;
    selectively opening a menu with an option to link said data unit to an event broker topic, wherein said selective opening occurs in response to a user selection of an input that opens the menu when a data unit is selected; and
    automatically linking said data unit to a particular user-selected event broker topic when said user selects said event broker topic to associate with said data unit.

3. The method of claim 2, wherein said associating step further comprises:
    first prompting said user for entry of a search term to define the appropriate event broker topic required;
    selecting, from among a master list of event broker topics, a set of appropriate event broker topics associated with the search term to provide to said user for selection.

4. The method of claim 2, wherein said linking step further comprises:
    responsive to a user selection to link said data unit to an event broker topic, automatically displaying a list of selectable event broker topics from which the user may select an appropriate event broker topic to link to the data unit.

5. The method of claim 2, further comprising:
generating the subscription message with a user selected topic within a topic header;
automatically assigning an appropriate network address of the event broker hosting said user selected topic to said subscription message; and
issuing said subscription message on the network with an address header for the event broker.

6. The method of claim 2, said associating step further comprising:
prompting said user for addressing information for the event broker topic; and
encapsulating a user-entered addressing information within a generated subscription message, wherein:
    said issuing step issues said subscription message to an event broker identified by said user-entered addressing information; and
    when said addressing information is not a correct address of an existing event broker, said method further includes:
        generating an error message; and
        listing a selection of available event broker topics to which the user may
        link the data unit for said updates.

7. The method of claim 2, wherein when the event broker contains multiple topics or multiple events within a topic, said method further comprises:
    filtering said event broker topic, wherein said filtering parses an event broker topic using SQL/SQL92 for specific information desired by said subscriber; and
    receiving updates of only relevant data from said event broker topic as determined by said SQL/SQL92 filtering.

8. The method of claim 1, further comprising:
    storing characteristics associated with the update within a tracking utility, wherein said characteristics include one or more of a time stamp, a data stamp, a notation made to the data by the event source, and other relevant characteristics assigned to the update; and
    enabling a display of said characteristics via selection and manipulation of said data unit.

9. The method of claim 1, wherein said application program is an Excel spreadsheet application and said data unit is a cell of said spreadsheet, wherein further HSSF protocol of the Apache POI APIs is utilized as the writing utility, wherein further, the subscriber and associated message listener are components of JMS (Java Messaging Service) client application.

10. A computer program product comprising:
    a tangible computer readable medium; and
    program code on said tangible computer readable medium for enabling dynamic, real-time updates to changing data of a data unit, said program code comprising code for:
        associating the data unit to a topic on an event broker on a network, wherein said event broker topic receives updates to said data by an external data source, wherein said associating code uses a publish/subscribe messaging paradigm and includes creating a subscription of said data unit to said event broker topic, said subscription having a corresponding message listener for receiving updates from said event broker, wherein said associating code provides a graphical user interface (GUI), which is a visual component of said application program that displays the data to a user, and wherein said associating code includes code for:
- opening a menu with an option to link said data unit to an event broker topic responsive to a user selection within said data unit; and
- linking said data unit to a particular user-selected event broker topic when said user selects said event broker topic to associate with said data unit;
- receiving said updates from said event broker via a message transfer service of the network, wherein when the event broker contains multiple topics or multiple events within a topic, said computer program product further comprises code for:
  - filtering said event broker topic, wherein said filtering parses an event broker topic using SQL/SQL92 for specific information desired by said subscriber;
  - receiving updates of only relevant data from said event broker topic as determined by said SQL/SQL92 filtering; and
  - automatically updating data in the data unit in response to receiving said updates, wherein said updating occurs independent of other data units within the application program and said updating replaces one of a null version and an older version of the data within the data unit with a newer version of the data and provides the older version of the data when no update of the data is received.

11. The computer program product of claim 10, wherein: said associating code further comprises code for:
- first prompting said user for entry of a search term to define the appropriate event broker topic required;
- selecting, from among a master list of event broker topics, a set of appropriate event broker topics associated with the search term to provide to said user for selection; and
- said linking code further comprises code that, responsive to a user selection to link said data unit to an event broker topic, automatically displays a list of selectable event broker topics from which the user may select an appropriate event broker topic to link to the data unit.

12. The computer program product of claim 11, said associating code further comprising code for:
- receiving a selection of the data unit within the application;
- selectively opening a menu with an option to link said data unit to an event broker topic, wherein said selective opening occurs in response to a user selection of an input that opens the menu when a data unit is selected;
- prompting said user for addressing information for the event broker topic; and
- encapsulating a user-entered addressing information within a generated subscription message, wherein:
  - said issuing code issues said subscription message to an event broker identified by said user-entered addressing information; and
  - when said addressing information is not a correct address of an existing event broker, said computer program product further includes:
    - generating an error message; and
    - listing a selection of available event broker topics to which the user may link the data unit for said updates.

13. The computer program product of claim 12, wherein said receiving code further comprises code for:
- storing characteristics associated with the update within a tracking utility, wherein said characteristics include one or more of a time stamp, a data stamp, a notation made to the data by the event source, and other relevant characteristics assigned to the update; and
- enabling a display of said characteristics via selection and manipulation of said data unit.

14. A method for providing a service that enables user applications to receive dynamic updates to data units within a program application executing on the user computer when those updates occur at an event/data source across a network, said method comprising:
- configuring a JMS Provider with event brokers hosting multiple topics of interest to users of the program application, wherein said JMS Provider receives published updates to data associated with each of said multiple topics from a data source;
- providing, to the user, an application software that extends the features of the program application to include (1) interface options to link the data unit to a specific event broker topic, (2) an application writing component that enables programmatic writing to the data unit of the user application; (3) and a subscriber utility with message listener functionality that processes received messages and forwards relevant data to the application writing component to programmatically update the data unit with the received data;
- enabling user subscriptions to the JMS Provider as an update service, wherein a subscription message is generated at and transmitted from the user computer to the event broker with a specific topic hosted by the event broker identified therein;
- forwarding to the user computer updates received on the specific topic subscribed to by the application running on the user computer, wherein said updates are provided to the user computer to complete the dynamic updates to the data unit of the application via the application writing component; and
- automatically updating data in the data unit in response to receiving said updates, wherein said updating occurs independent of other data units within the application program and said updating replaces one of a null version and an older version of the data within the data unit with a newer version of the data and provides the older version of the data when no update of the data is received.

15. The method of claim 14, further comprising:
- generating a list of available topics to which the data unit of the user application may be associated; and
- providing the list to a user during initial set-up of the data unit for receipt of dynamic updates, wherein the list is downloaded to the user computer when a request generated by the software utility is received, said request being generated responsive to a user selection to link the data unit to a topic for dynamic updates.

16. The method of claim 14, further comprising allocating resources of said JMS Provider to an event broker operating via a publish/subscribe messaging paradigm and which supports topic specific subscriptions by a plurality of subscribers associated with data units of the application on the user computer of multiple users, such that resources are available to handle said plurality of subscribers.

17. The method of claim 14, further comprising:
- responsive to a user request to register for said dynamic update service, downloading and integrating computer-readable code into the user computer, wherein the code, in combination with the program application and OS executing on the computer system is capable of performing one or more of the following steps:
- associating the data unit to a topic on an event broker on a network, wherein said event broker topic receives updates to said data by an external data source;
- receiving said updates from said event broker via a message transfer service of the network; and
  - automatically updating data in the data unit in response to receiving said updates, wherein said updating occurs independent of other data units within the application program and said updating replaces one of a null version and an older version of the data within the data unit with a newer version of the data and provides the older version of the data when no update of the data is received;
- wherein said associating step includes:
  - opening a menu with an option to link said data unit to an event broker topic responsive to a user selection within said data unit; and
  - linking said data unit to a particular user-selected event broker topic when said user selects said event broker topic to associate with said data unit;
- responsive to a user selection to link said data unit to an event broker topic, automatically displaying a list of selectable event broker topics from which the user may select an appropriate event broker topic to link to the data unit;
- filtering said event broker topic, wherein said filtering parses an event broker topic using SQL/SQL92 for specific information desired by said subscriber; and
- receiving updates of only relevant data from said event broker topic as determined by said SQL/SQL92 filtering; and
  - activating said message listener when an update is available, wherein said message listener processes said message to determine which data unit said update is associated with, wherein multiple subscribers associated with multiple data units may be assigned a single message listener and said message listener maintains a table of topics-to-data unit pairings;
  - forwarding said update and an identifier of the associated data unit to an application writing utility, which completes said programmatic writing of said update to said data unit;
  - determining a write-to characteristic of the program application with the data unit; and
  - activating a specific writing utility capable of pro grammatically updating said data unit of the program application, wherein each program application may require a particular one of multiple available writing utilities to update a data unit of that program application.

18. A system for enabling dynamic, real-time data update service for data within user applications, said system comprising:
- an event broker application running on a server on a network that is accessible to a plurality of client computers and supports a publish/subscribe messaging protocol;
- a central data source that supplies real-time data to said event broker; and
- a customer computer running an application that requires updates to data within particular user-selectable data units; and
- a dynamic data update utility (DDUU) executing on the customer computer that enables a selected data unit of said executing application to be registered/subscribed with said event broker application to receive said real-time updates, wherein said real-time updates are programmatically written to the data unit by an application writing utility;
- wherein said DDUU further enables automatically updating data in the data unit in response to receiving said updates, wherein said updating occurs independent of other data units within the application program and said updating replaces one of a null version and an older version of the data within the data unit with a newer version of the data and provides the older version of the data when no update of the data is received.

19. The system of claim 18, further comprising:
- a software utility executing on said customer computer system and associated with said executing application that enables a user of said executing application to select which of a plurality of selectable cells of the executing application to link to a selected event broker topic; and
- means associated with the software utility for downloading a list of all available event broker topics in response to the user selecting to link the cell;
- wherein the software utility further executes on the computer system to provide the following functions:
- responsive to a user request to register for said dynamic update service, downloading and integrating computer-readable code into the user computer, wherein the code, in combination with the program application and OS executing on the computer system is capable of performing one or more of the following steps:
  - associating the data unit to a topic on an event broker on a network, wherein said event broker topic receives updates to said data by an external data source;
  - receiving said updates from said event broker via a message transfer service of the network; and
    - automatically updating data in the data unit in response to receiving said updates, wherein said updating occurs independent of other data units within the application program and said updating replaces one of a null version and an older version of the data within the data unit with a newer version of the data and provides the older version of the data when no update of the data is received;
  - wherein said associating step includes:
    - opening a menu with an option to link said data unit to an event broker topic responsive to a user selection within said data unit; and
    - linking said data unit to a particular user-selected event broker topic when said user selects said event broker topic to associate with said data unit.

20. The method of claim 19, further comprising:
- responsive to a user selection to link said data unit to an event broker topic, automatically displaying a list of selectable event broker topics from which the user may select an appropriate event broker topic to link to the data unit;
- filtering said event broker topic, wherein said filtering parses an event broker topic using SQL/SQL92 for specific information desired by said subscriber; and
- receiving updates of only relevant data from said event broker topic as determined by said SQL/SQL92 filtering; and
  - activating said message listener when an update is available, wherein said message listener processes said message to determine which data unit said update is associated with, wherein multiple subscribers associated with multiple data units may be assigned a single message listener and said message listener maintains a table of topics-to-data unit pairings;

forwarding said update and an identifier of the associated data unit to an application writing utility, which completes said programmatic writing of said update to said data unit;

determining a write-to characteristic of the program application with the data unit; and activating a specific writing utility capable of programmatically updating said data unit of the program application, wherein each program application may require a particular one of multiple available writing utilities to update a data unit of that program application.

* * * * *